April 24, 1962     H. CHAIT     3,031,038

MAGNETIC WHEEL LOCK

Filed Nov. 16, 1959

Hyman Chait
INVENTOR.

BY *Clarence A. O'Brien*
*and Harvey B. Jacobson*
Attorneys

United States Patent Office 3,031,038
Patented Apr. 24, 1962

3,031,038
MAGNETIC WHEEL LOCK
Hyman Chait, Los Angeles, Calif., assignor, by mesne assignments, of fifty-five percent to Irving Stollman, Detroit, twenty-four percent to Sheldon M. Lutz, Detroit, seventeen percent to Richard T. Gerloff, Redford, and four percent to Louis Rosensweig, Detroit, Mich.
Filed Nov. 16, 1959, Ser. No. 853,241
8 Claims. (Cl. 188—111)

The present invention relates to a caster structure, and more particularly to a new and novel magnetic type caster structure which effectively prevents the rotation of the caster wheel forming a part thereof when the latter travels through a magnetic field.

As is known, a serious problem has arisen by reason of the increasing loss of shopping carts of the type found in supermarkets or the like, where such loss represents an economic as well as a practical burden to the owners thereof. By virtue of the instant invention, the applicant has provided a new and novel arrangement for preventing the aforesaid loss, which not only has application to carts used in supermarkets or like locations, but also where any type of wheel locking is desired.

Accordingly, and broadly, the applicant has provided a new and novel magnetic type caster structure which effectively prevents the rotation of the caster wheel when the latter travels through a magnetic field or barrier created by imbedding a magnetic structure in the surface over which the caster wheel is rolling. Such new and novel results are accomplished by pivotally mounting one end of a permanent magnet on part of the supporting framework for the caster wheel, whereupon the traveling of the caster wheel over the imbedded magnetic structure effects the pivoting of the permanent magnet into locking engagement with a cammed portion disposed on the aforesaid wheel. Such locking action is a result of a repelling effect, created by like polarities of the free end of the permanent magnet and the portion of the imbedded magnetic structure adjacent the surface. Thus, until the pivotal magnet is removed from the field created by the magnetic barrier and physical unlocking is effected, the caster wheel is locked against rotational displacement, and, hence, the cart on which the caster wheel is typically positioned, is incapable of rolling movement.

In an alternate embodiment of the invention, the aforementioned pivotal magnet is caused to engage a pin-like member which extends outwardly from a portion of the caster wheel. The locking operation, however, is accomplished in the same manner as described hereabove and with equally effective results.

Accordingly, the principal object of the present invention is to provide a new and novel magnetic type caster structure.

A further object of the present invention is to provide a new and novel caster structure having a pivotal magnetic component which prevents rotation of the caster wheel when the latter moves through a magnetic barrier.

A still further and more general object of the present invention is to provide a new and novel magnetic type caster structure formed from a minimum number of components which cooperate to provide a highly effective manufactured product.

Other objects and a better understanding of the present invention should be come more apparent from the following description, taken in conjunction with the accompanying drawing, wherein FIGURE 1 is a fragmentary elevational view of a wheel conventionally utilized with a grocery cart or such and illustrates the magnetic actuating means which may be utilized in connection therewith;

Figure 1:
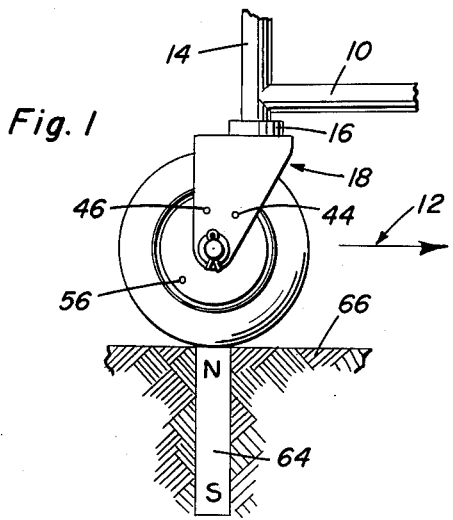

With continuing reference to the drawings, numeral 10 represents a portion of a conventional grocery cart and more particularly preferably illustrates the rear lower frame portion. The arrow 12 indicates the directional movement of the grocery cart and frame 10. Supported for rotational movement about a vertical frame member 14 is a bearing 16 which is preferably a ball bearing disk as indicated. A supporting structure 18 having a U-shape including a bight portion 20 and depending legs 22 and 24 is secured to the bearing 16.

Aligned apertures are defined in the legs 22 and 24 and an axle pin 26 having a head 28 and shank 30 is received through the aligned apertures in the legs 22 and 24 of the supporting structure 18. A washer 32 is terminally received on the pin 26 and a cotter pin 34 is received through a passage in the pin 26 for securing the axle pin of the supporting structure 18.

A wheel 36 having a central aperture therein is rotatably received on the axle pin 26. The wheel 36 preferably circumferentially suports a rubber tire 40 thereof.

Figure 3:
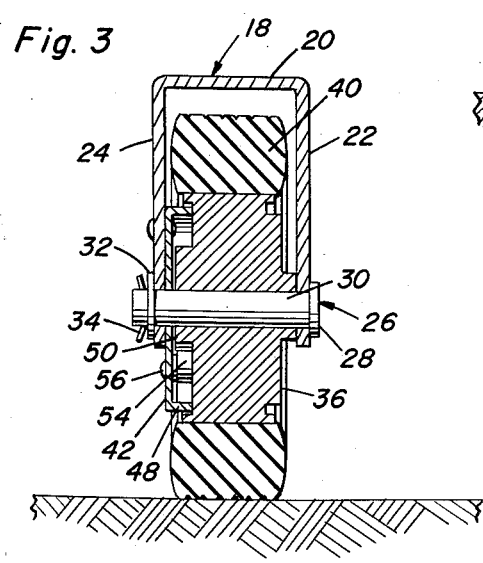
FIGURE 3 is sectional view taken substantially along the plane 3—3 of FIGURE 2.

A circular shield 42, made from a non-magnetic material, is bolted to the leg 24 of the supporting structure 18 by a pair of bolts 44 and 46. The shield 42 has a circular flange 48 which extends inwardly toward the wheel 36. The wheel 36 has an outside flat surface 50 which defines a circular groove 52 therein. As is particularly illustrated in FIGURE 3, the circular flange 48 extends perpendicularly toward the surface 50 and into the groove 52.

Pivotally supported from the shield 42 is an arcuate permanent magnet 54 which is pivoted about pin 56 secured to the shield 42. Again referring to FIGURE 3, it will be seen that the magnet 54 rides in the groove 52 defined in the wheel 36. Adjacent the groove 52, the surface 50 of the wheel 36 defines a notched end portion 60 and a shoulder 62. The notched end portion 60 of the surface 50 lies immediately adjacent the groove 52 as is particularly illustrated in FIGURE 2.

Figure 2:
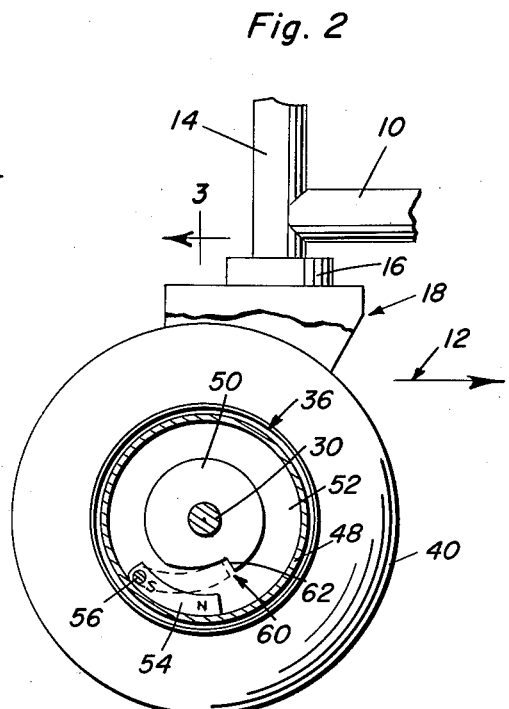
FIGURE 2 is a longitudinal fragmentary enlarged sectional view taken substantially along the vertical plane of the wheel and further illustrates the cooperating relationship between the magnetic actuating means and the pivotally carried magnet.

With reference to FIGURE 2, it is to be noted that the arcuate magnet 54 is elongated and pivoted only at one end thereof. Therefore, a free pole is defined at a second end of the magnet 54. With reference to FIGURE 2, the south pole of the magnet is illustrated as being pivoted to the shield 42 while the north pole is illustrated as being free. Of course, it will be realized that either pole could be pivoted and either pole could be free. A permanent magnet 64 or a series of permanent magnets is vertically embedded in the ground 66 as is illustrated in FIGURES 1 and 2. The location for embedding the permanent magnetic 64 in the ground 66 is preferably adjacent the supermarket parking lot exit if the teachings of this invention are being utilized with a grocery cart. However, of course it will be realized that since the teachings herein may be utilized in a number of different environments, the magnet 64 may be disposed or positioned at will. The permanent magnet 64 defines a north pole adjacent the ground surface while the south pole is embedded therebelow. The particular utilization and operation of the device is now thought to be apparent. When the grocery cart is being wheeled in the direction of the arrow 12, the wheel 36 and tire 40 will rotate in a clockwise direction looking at FIGURES 1 and 2. When the wheel 36 enters the vicinity of the embedded magnet 64, the north pole thereof will repel the north pole of the pivoted magnet 54 so that the magnet assumes the dotted line position or pivoted position illustrated in FIGURE 2. Because the magnet 54 is a permanent magnet having only weak characteristics, it will be magnetically retained adjacent the surface 50 of wheel 36 until the shoulder 62 moves around to abut the end of magnet 54 but the magnetism of the permanent magnet 54 is not sufficient to pivot itself up to the shoulder 62 without the impetus provided by the permanent magnet 64. When the shoulder 62 abuts the magnet 54 it will be apparent that the cart may no longer be rolled forwardly. Though the cart may still be stolen by lifting it and placing it in a truck or such, the locking means provided acts as a sufficient deterrent for preventing the loss of a considerable number of carts or such.

Figure 4:
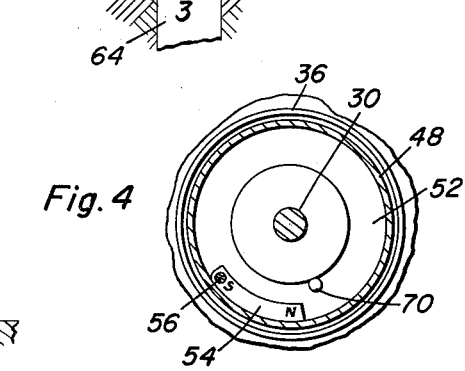
FIGURE 4 is a fragmentary sectional view illustrating an alternate form of stop means which may be substituted for the stop means illustrated in FIGURE 2.

Referring particularly to FIGURE 4, alternate means are provided in the form of a pin 70 which perpendicularly extends outwardly from the groove 52 and as will be apparent substantially replaces the shoulder 62 illustrated in FIGURE 2.

From the foregoing, it will be appreciated that the above has provided simple means for preventing the grocery cart or such from being removed from the supermarket grounds. Inasmuch as the shield 42 limits access to the pivotal magnet 54, an additional magnet must be used to draw magnet 54 out of engagement with the shoulder 62 of pin 70.

The foregoing is considered as illustrative only of the principles of the invention. Further, since numerous modifications and changes will readily occur to those skilled in the art, if it is not desired to limit the invention to the exact construction and operation shown and described, and accordingly all suitable modifications and equivalents may be resorted to, falling within the scope of the invention as claimed.

What is claimed as new is as follows:

1. A braking structure for a wheel comprising supporting framework for said wheel, first magnetic means movably mounted on said supporting framework, means on said wheel cooperable with said first magnetic means for locking said wheel against rotational displacement, and second magnetic means stationary and independent of said supporting framework moving said first magnetic means into locking engagement with said means on said wheel when said first and said second magnetic means are brought into proximity with each other.

2. The braking structure of claim 1 where said second magnetic means is embedded in a surface on which said wheel travels.

3. A braking structure for a wheel comprising a supporting framework for said wheel, first magnetic means pivotally mounted on said supporting framework adjacent said wheel, said wheel having a cammed portion forming a part thereof cooperable with said first magnetic means for locking said wheel against rotational displacement, and second magnetic means stationary and independent of said supporting framework moving said first magnetic means into locking engagement with said cammed portion forming a part of said wheel when said first and said second magnetic means are brought into proximity with each other.

4. The braking structure of claim 3 where said first magnetic means and said second magnetic means each establish a magnetic field of like polarity.

5. A braking structure for a wheel comprising supporting framework for said wheel, first magnetic means pivotally mounted on said supporting framework adjacent said wheel and normally disposed in a first position, said wheel having a cammed portion thereon defining a position locking said wheel against rotational displacement when engaged by said first magnetic means, second magnetic means stationary and independent of said supporting framework establishing a magnetic field urging said first magnetic means into said locking position when said first and said second magnetic fields are brought into proximity with each other.

6. The braking structure of claim 5 where said magnetic field established by said second magnetic means is of like polarity with the magnetic field established by said first magnetic means and of greater magnitude.

7. A braking structure for a wheel comprising supporting framework for said wheel, a support member disposed on said framework, first magnetic means pivotally mounted on said support member adjacent said wheel, said wheel having a groove defined by a portion of said support member through which said first magnetic means travels and stop means forming a part thereof cooperable with said first magnetic means for locking said wheel against rotational displacement, and second magnetic means stationary and independent of said supporting framework moving said first magnetic means into locking engagement with said stop means when said first and said second magnetic means are brought into proximity with each other.

8. The braking structure of claim 7 where said first magnetic means and said second magnetic means are each permanent magnets.

References Cited in the file of this patent

UNITED STATES PATENTS

| | | |
|---|---|---|
| 2,112,686 | Barton | Mar. 29, 1938 |
| 2,669,489 | Kuhn | Feb. 16, 1954 |
| 2,964,140 | Berezny | Dec. 13, 1960 |